CELESTIAL-INERTIAL DOPPLER MODE

Oct. 26, 1965  V. H. SELIGER ETAL  3,214,575
CELESTIAL-INERTIAL NAVIGATION SYSTEM
Filed Sept. 14, 1961  10 Sheets-Sheet 9

Fig. 5A

CELESTIAL-INERTIAL DOPPLER MODE

INVENTORS
VICTOR H. SELIGER
SAUL MOSKOWITZ
BY Borst & Borst
ATTORNEYS

Oct. 26, 1965

V. H. SELIGER ETAL 3,214,575

CELESTIAL-INERTIAL NAVIGATION SYSTEM

Filed Sept. 14, 1961

Fig. 6.

COORDINATE FRAMES 1, 2, 3 INERTIAL FRAME (NON-ROTATING, EARTH CENTERED)
1', 2', 3' BODY FRAME (ROLL, PITCH, YAW)
1", 2", 3" EARTH LEVEL FRAME (NORTH, EAST, VERTICAL)
1''', 2''', 3''' EARTH FIXED FRAME (ROTATING AT EARTH RATE ABOUT $\bar{\omega}_e$ AXIS)

Fig. 7.

INVENTORS
VICTOR H. SELIGER
SAUL MOSKOWITZ
BY
Borat & Borat
ATTORNEYS

United States Patent Office 3,214,575
Patented Oct. 26, 1965

---

3,214,575
CELESTIAL-INERTIAL NAVIGATION SYSTEM
Victor H. Seliger, Lynbrook, and Saul Moskowitz, Brooklyn, N.Y., assignors to Sperry Rand Corporation (Ford Instrument Co. Division), Long Island City, N.Y., a corporation of Delaware
Filed Sept. 14, 1961, Ser. No. 139,040
11 Claims. (Cl. 235—151)

This invention relates to navigational systems and particularly to improved equipment for providing accurate positional information of air-borne vehicles while maneuvering over all types of terrain and under all atmospheric conditions, especially at high altitudes and at high speeds.

An object of the invention is to provide a navigational system which will function in a plurality of modes so that, under any one set of local atmospheric and terrain conditions, a particular operational mode can be selected which yields the most accurate present position and attitude of an air-borne vehicle as well as the great circle course and distance to destination.

Another object of the invention is to provide a navigational system which incorporates, in selective combinations, high speed, moderate speed and slow speed computers for the purpose of reducing the weight and size of the navigational equipment.

Another object of the invention is to provide a navigational system which incorporates, in selective combinations, high accuracy, moderate accuracy and low accuracy computers for the purpose of reducing the weight and size of the navigational equipment.

Another object of the invention is to provide a navigational system which utilizes, in selective combinations, a plurality of mathematically established computational reference spaces for the purpose of increasing the speed and accuracy of the system as well as for the purpose of reducing the weight and size of the navigational equipment.

Another object of the invention is to provide an improved indication of the vertical in the air-borne vehicle for a navigational reference.

Another object of the invention is to provide improved navigational equipment which will bound, or limit, the error of the indicated vertical, provide damping of such error and for and azimuth drift compensation.

Another object of the invention is to provide an improved navigational system which can yield positional and attitude data of very high accuracy from celestial observations taken from a maneuvering air-borne vehicle which may even assume an inverted position.

Still another obeject of the invention is to provide improved navigational equipment which relies upon inertial data when celestial observations are obscured.

Generally, prior art navigational systems incorporated a physical gimbaled earth-level platform in the air-borne vehicle which was stabilized by gyroscopes. By employing body-mounted sensors in an inertial navigational system, as disclosed in copending U.S. application Ser. No. 625,544 filed November 30, 1956, now Patent No. 3,087,-333, and particularly with the improved inertial operational mode of the navigational system of the present invention, the following advantages are attained:

(a) Elimination of gimbal structure, (b) Avoidance of gimbal lock under any and all attitudes of the air-borne vehicle, (c) Reduction in size and weight as compared with mechanical platform systems, and (d) Greater adaptability for miniaturization programs.

In accordance with a principal aspect of the present invention there is provided a navigational system for an air-borne vehicle which comprises gyro sensor means in the vehicle for providing angular velocity with respect to an inertial frame, accelerometer means in the vehicle for providing acceleration with respect to the inertial frame, an altimeter for providing the Schuler radius with respect to the center of the earth, body/inertial reference frame transformation means coupled to the gyro sensor means, inertial/earth-level transformation means coupled to the accelerometer means and the altimeter, and body/earth-level transformation means coupled to the body/inertial transformation means and the inertial/earth-level transformation means.

Other features of the invention incorporate celestial devices and/or doppler radar equipment with the inertial section of the navigational system so as to effect the following added advantages:

(a) Achievement of the vertical, with bounded or limited error thereabout, for the mathematical earth-level space which replaces the physical earth-level platform of the prior art systems;

(b) Provide error damping and drift compensation;

(c) Determination for the air-borne vehicle of present position and great circle course and distance to destination with greater accuracy;

(d) For a desired degree of accuracy, equipment requiring a smaller number of high speed computations and thereby providing an optimum computer;

(e) For a desired degree of accuracy, equipment requiring the majority of computations at slow speeds which are achievable with minimum equipment requirements or standard state of the art circuits; and (f) Employment of only one mathematical earth-level space for two or more telescope emplacements on different sides, including opposite sides, of the vehicle instead of a plurality of physical platforms with attendant size, weight and operational problems when the air-borne vehicle is maneuvering.

Other objects and features of the present invention will be set forth or apparent in the following description and claims and illustrated in the accompanying drawings, which disclose, by way of example and not by way of limitation, in a limited number of embodiments, the principle of the invention and implementations of the inventive concept.

In the drawings, in which like reference numbers designate like components in the several diagrams.

As used in this disclosure, body space is associated with the air-borne vehicle and has three mutually perpendicular axes along the roll (longitudinal), pitch (transverse) and yaw (perpendicular to roll and pitch) axis of the vehicle, respectively. Inertial space has three mutually perpendicular fixed axes at the center of the earth with one axis along the earth's axis of rotation, inertial space being defined as an environment where Newton's equation $F=Ma$ applies. Earth-level space has three mutually perpendicular axes in the air-borne vehicle, one of such axes lying along the line from the vehicle to the center of the earth. Also, earth-fixed space is defined as having three mutually perpendicular axes, one of which is along the earth's axis of rotation while the other two revolve with the earth.

Figure 1:
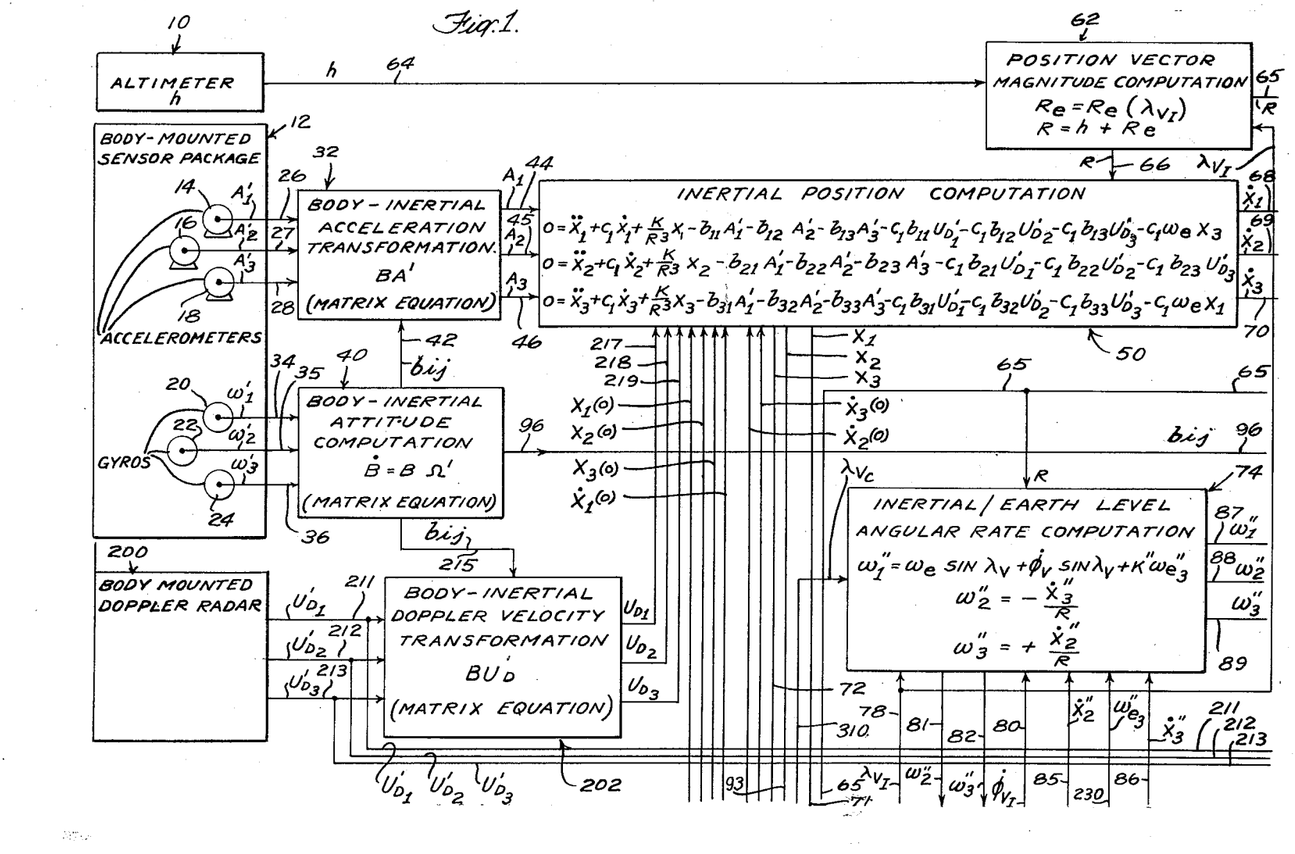
FIG. 1 to 1c represent a block diagram of the overall five-mode operational navigation system according to the invention.
Figure 1A:
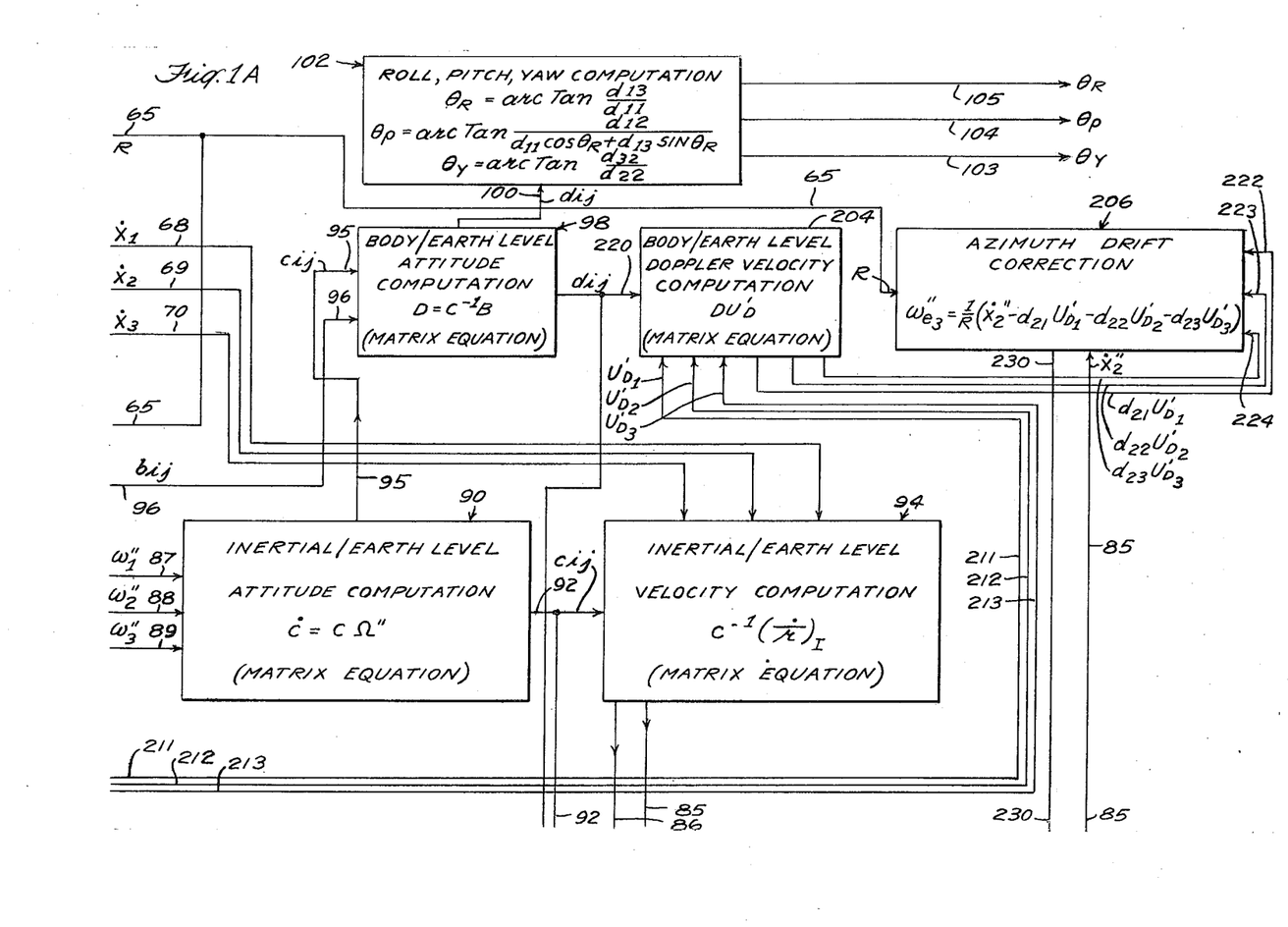
Figure 1B:
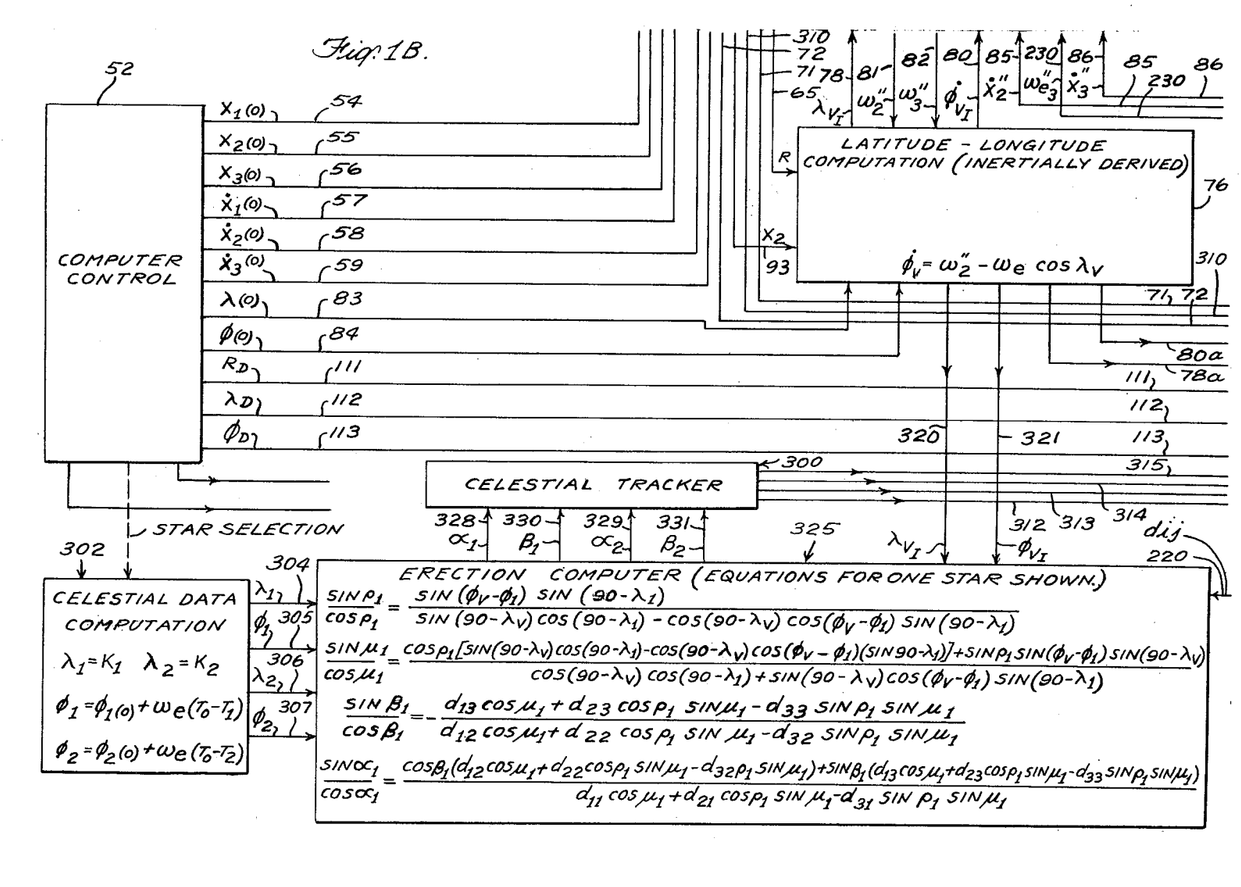
Figure 1C:
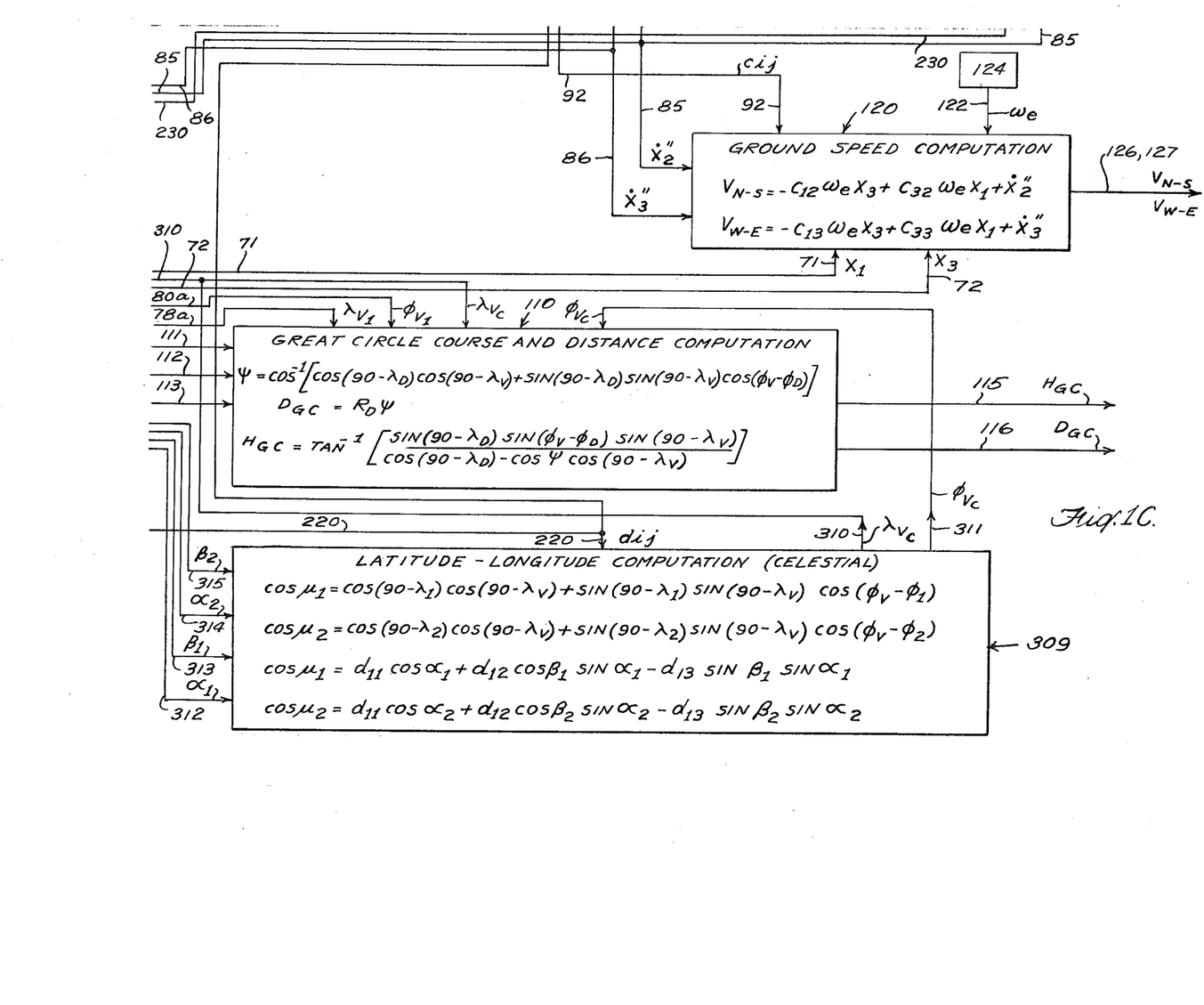
Figure 2:
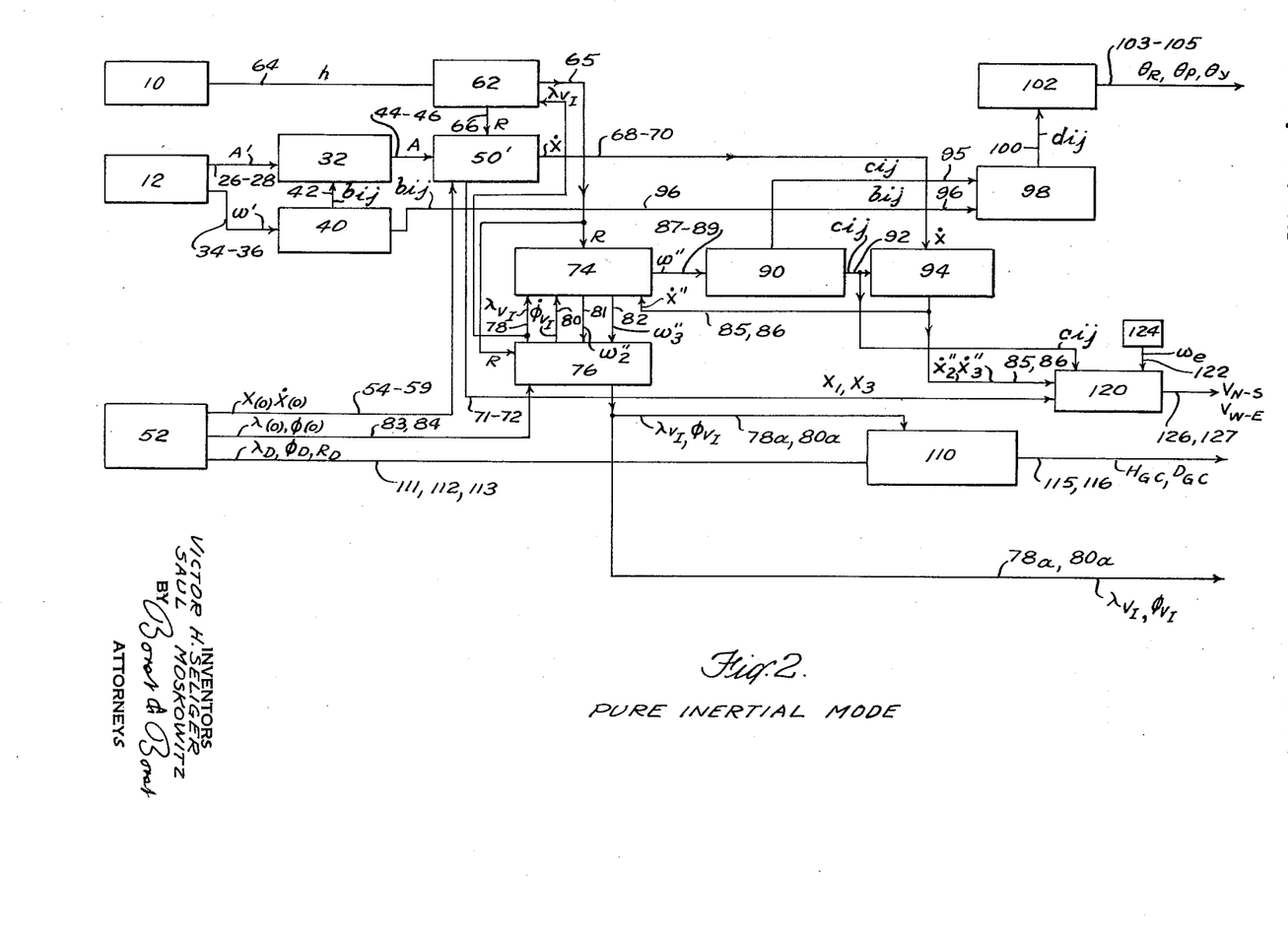
FIG. 2 is a block diagram of the navigational system of FIG. 1 operating in a Pure Inertial Mode.
Figure 3:
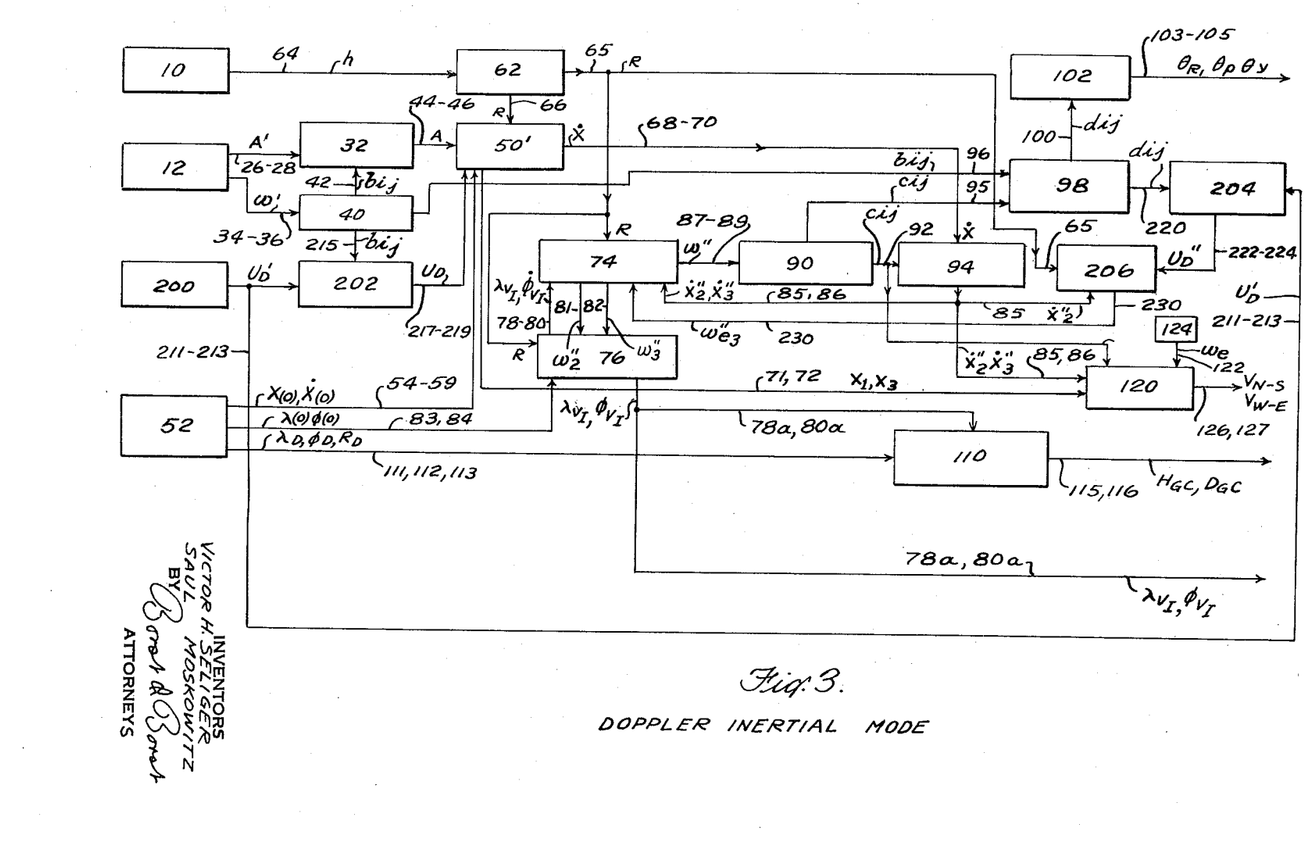
FIG. 3 is a block diagram of the navigational system of FIG. 1 operating in a Doppler-Inertial Mode.
Figure 4:
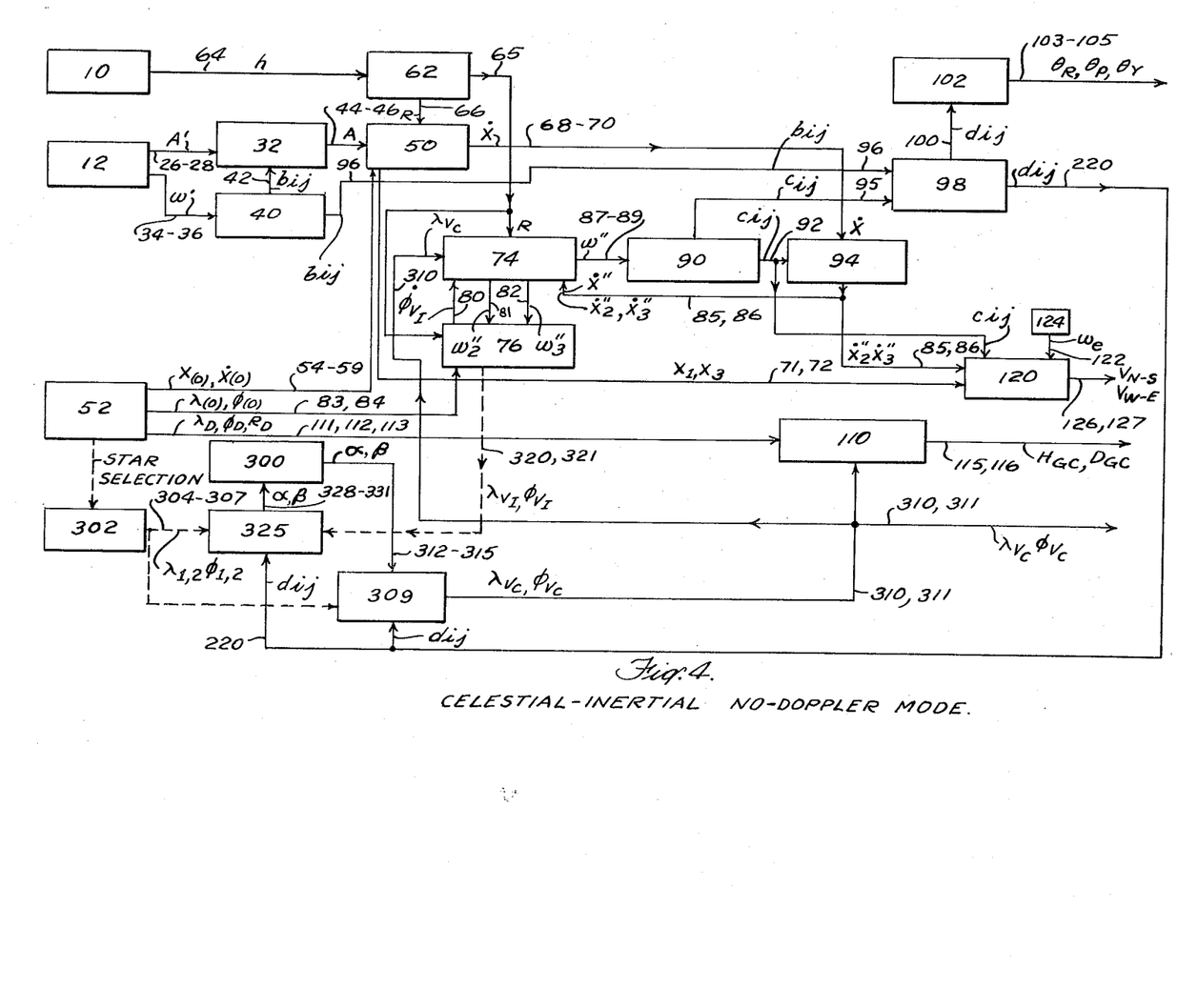
FIG. 4 is a block diagram of the navigational system of FIG. 1 operating in a Celestial-Inertial No-Doppler Mode.
Figure 5:
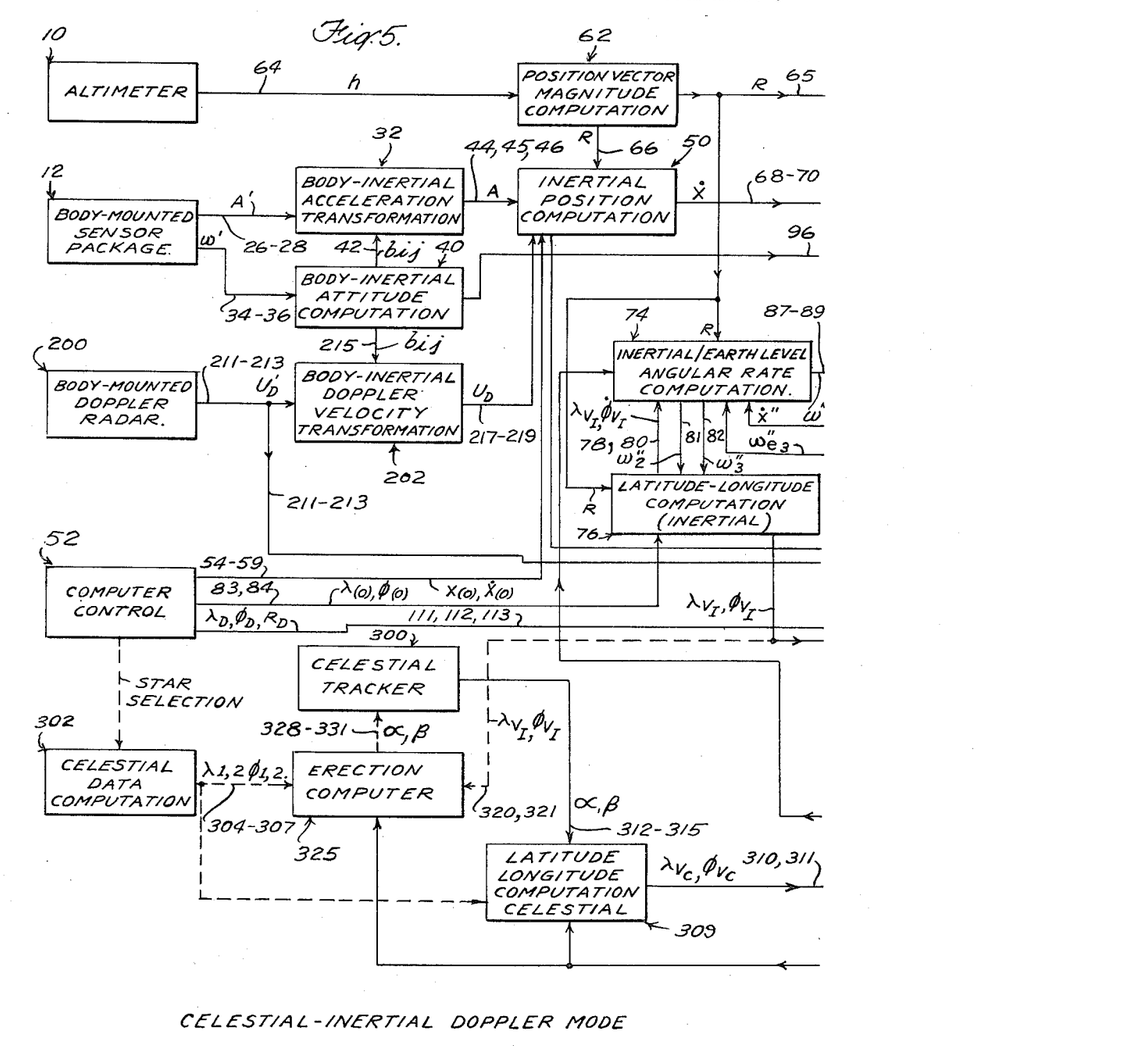
FIGS. 5 and 5A, together, represent a block diagram of the navigational system of FIG. 1 operating in a Celestial-Inertial-Doppler Mode.
Figure 5A:
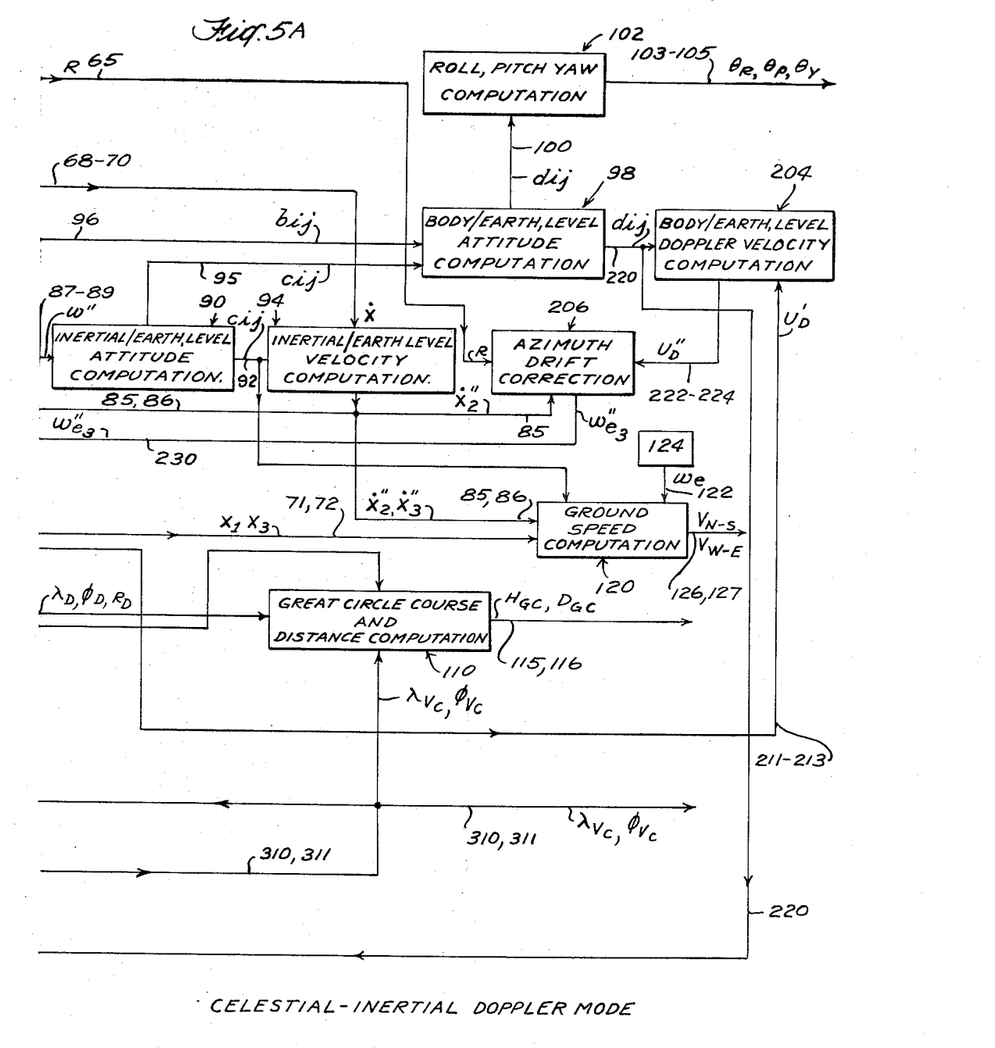

The basic arrangement of elements for the system which is common to all operational modes as shown in FIGS. 1 to 5 is represented in FIG. 2 and is designated the Pure Inertial Mode. FIGURES 3 to 5 add other elements to the fundamental system shown in FIG. 2 for the other operational modes. FIG. 1 is the overall diagram of the entire navigational system which can selectively operate in any one of the modes in FIG. 2 (Pure Inertial), FIG. 3 (Doppler-Inertial), FIG. 4 (Celestial-Inertial) or FIG. 5 (Celestial-Inertial-Doppler). The accuracy of the navigational system increases successively as the operating mode is switched from FIG. 2 to FIG. 5, provided the added components associated with FIGS. 3 to 5 adequately respond to the existing weather and terrain conditions.

(I) FUNDAMENTAL SYSTEM OR PURE INERTIAL MODE

Referring to FIGS. 1 and 2, there is provided in the air-borne vehicle an altimeter 10 to yield altitude $h$, a body-mounted sensor package 12 comprsing accelerometers 14, 16 and 18 mounted along the longitudinal (roll), transverse (pitch) and vertical (yaw) body axes of the air-borne vehicle and gyros 20, 22 and 24 mounted along roll, pitch and yaw axes, respectively. Representative construction details and the arrangements for mounting the accelerometers and gyros on the three body axes are shown in copending U.S. application Serial No. 625,544, filed November 30, 1956. Accelerometers 14, 16 and 18 yield the body accelerations $A'_1$, $A'_2$ and $A'_3$ along each of the body reference axes while gyros 20, 22 and 24 yield the angular velocity $\omega'_1$, $\omega'_2$ and $\omega'_3$ of the body space relative to inertial space (in body space) about each of the same body axes.

The vehicle position is computed in an earth-centered inertial space using accelerometric data transformed from body space to inertial space coordinates by means of a B matrix to be defined later. The elements of the B matrix are computed from the outputs of the body-mounted angular rate measuring gyros.

The body accelerations $A'_1$, $A'_2$ and $A'_3$ as outputs from accelerometers 14, 16 and 18 are conducted by leads 26, 27 and 28, respectively, to a computer section 32 which performs transformations of vehicle accelerations from body space to inertial space. Mathematically, the computation can be expressed as $$a = Ba' \quad (1)$$

where:
$a$ are the vector components in inertial space
$a'$ are the vector components in body space, and
B is the transformation matrix from body space to inertial space.

Equation 1 is a conventional "short-hand" designation of the following matrix equations:

$$\begin{pmatrix} a_1 \\ a_2 \\ a_3 \end{pmatrix} = \begin{pmatrix} b_{11} & b_{12} & b_{13} \\ b_{21} & b_{22} & b_{23} \\ b_{31} & b_{32} & b_{33} \end{pmatrix} \begin{pmatrix} a'_1 \\ a'_2 \\ a'_3 \end{pmatrix}$$

or $$a_1 = b_{11}a'_1 + b_{12}a'_2 + b_{13}a'_3$$
$$a_2 = b_{21}a'_1 + b_{22}a'_2 + b_{23}a'_3$$
$$a_3 = b_{31}a'_1 + b_{32}a'_2 + b_{33}a'_3$$

Now, let C be the transformation matrix from earth-level to inertial space, or $$a = Ca'' \quad (2)$$

where $a''$ are the vector components in earth-level space. Then the transformation from body to earth-level space may be denoted by matrix D, or $$a'' = Da' \quad (3)$$

Therefore, $$D = C^{-1}B \quad (4)$$

Matrix B may be computed by:

$$\dot{B} = B\Omega'$$

where

B is the transformation matrix from body space to inertial space,
$\dot{B}$ is the time derivative of B, and
$\Omega'$ is the matrix representing the vector operation $\omega \times$ in body space with elements $\omega'_1$, $\omega'_2$, and $\omega'_3$, or $$\Omega' = \begin{pmatrix} 0 & -\omega'_3 & \omega'_2 \\ \omega'_3 & 0 & -\omega'_1 \\ -\omega'_2 & \omega'_1 & 0 \end{pmatrix} \quad (6)$$

where $\omega'_1$, $\omega'_2$ and $\omega'_3$ are the outputs of the body-mounted rate-measuring gyroscopes 20, 22 and 24.

The body angular velocites in inertial space $\omega'_1$, $\omega'_2$ and $\omega'_3$ as outputs from gyros 20, 22 and 24 are conducted on leads 34, 35 and 36, respectively, to a computer 40 for determining the desired mathematical B matrix elements $b_{ij}$ by body-inertial attitude computation. Where $b_{ij}$ are the nine elements of the B matrix being actually the nine direction cosines used to transform vector components from the body frame to the inertial frame.

As shown, a lead 42 transmits the elements $b_{ij}$ of the B transformation matrix from computer 40 to computer 32. Computer 32 yields, on leads 44, 45 and 46, the accelerations $A_1$, $A_2$ and $A_3$ of the air-borne vehicle in inertial space, as determined by Equation 1.

A computer 50 determines the inertial present position and the inertial present velocity of the air-borne vehicle by receiving as input data the initial inertial position and velocity of the vehicle, the inertial accelerations of the vehicle as determined by computer section 32 and the magnitude of the position vector from the earth's center to the vehicle.

As shown in FIGS. 1 and 2, a computer control 52 provides an initial inertial position of the vehicle, $X_{1(0)}$, $X_{2(0)}$ and $X_{3(0)}$, as an input to computer 50 on leads 54, 55 and 56 as well as another input of an initial inertial velocity of the vehicle, $\dot{X}_{1(0)}$, $\dot{X}_{2(0)}$ and $\dot{X}_{3(0)}$, on leads 57, 58 and 59, respectively.

The magnitude R of the position vector $\bar{r}$ from the earth's center to the vehicle is the sum of the distance $R_e$ from the earth's center to the earth's surface immediately below the vehicle and the altitude $h$ of the vehicle as determined by altimeter 10. For stability, the altitude $h$ should be derived from an independent (non-inertial) source, such as a barometric altimeter. Thus, $$R = R_e + h \quad (7)$$

If it is assumed that the earth is approximately spherical, $R_e$ is then constant. However, it may be preferable to represent $R_e$ as a power series expansion in latitude:

$$R_e(\lambda) = R_e(0) + K_1\lambda_v + K_2\lambda_v^2 + K_3\lambda_v^3 + \ldots \quad (8)$$

The degree of the expansion is dictated by the desired accuracy.

Computer 62 receives, as an input, an altitude signal on lead 64 from altimeter 10 for performing the mathematical computation according to Equations 7 or 8 and yields the resulting quantity R on leads 65 and 66, lead 66 providing an input of R to computer 50.

As another input, computer 50 receives, by way of leads 44, 45 and 46, the inertial acceleration of the vehicle, $A_1$, $A_2$ and $A_3$, from computer 32.

The mathematics to which computer 50 will respond will now be derived. If $\bar{A}$ is the output of an orthogonal triad of accelerometers, then:

$$\bar{A} = (\ddot{\bar{r}})_I + \bar{g} \quad (9)$$

where $\bar{r}$ is the vector from the earth's center to the vehicle; $(\ddot{\bar{r}})_I$ is the second time derivative of the vector $\bar{r}$ relative to inertial space; and $\bar{g}$ is the apparent acceleration vector due to gravity. But:

$$\bar{g} = K\bar{r}/R^3 \quad (10)$$

where K is a constant and R is the magnitude of the $\bar{r}$ vector.

$$\therefore (\ddot{\bar{r}})_I + K\bar{r}/R^3 = \bar{A} \quad (11)$$

Equation 11 in component form becomes:

$$0 = \ddot{X}_1 + \frac{K}{R^3}X_1 - b_{11}A'_1 - b_{12}A'_2 - b_{13}A'_3 \quad (12)$$

$$0 = \ddot{X}_2 + \frac{K}{R^3}X_2 - b_{21}A'_1 - b_{22}A'_2 - b_{23}A'_3 \quad (13)$$

$$0 = \ddot{X}_3 + \frac{K}{R^3}X_3 - b_{31}A'_1 - b_{32}A'_2 - b_{33}A'_3 \quad (14)$$

where $\ddot{X}_1$, $\ddot{X}_2$ and $\ddot{X}_3$ are the second time derivatives of inertial present positions of the vehicle $X_1$, $X_2$ and $X_3$, respectively.

Equations 12, 13 and 14 are solved in computer 50 and yield solutions for $\bar{X}$ and $(\bar{X})_I$.

As output quantities, the inertial position computer 50 provides the inertial present velocities $\dot{X}_1$, $\dot{X}_2$ and $\dot{X}_3$ on leads 68, 69 and 70 and the inertial present positions $X_1$ and $X_3$ on leads 71 and 72, respectively.

(A) *Latitude and longitude*

Figure 6:
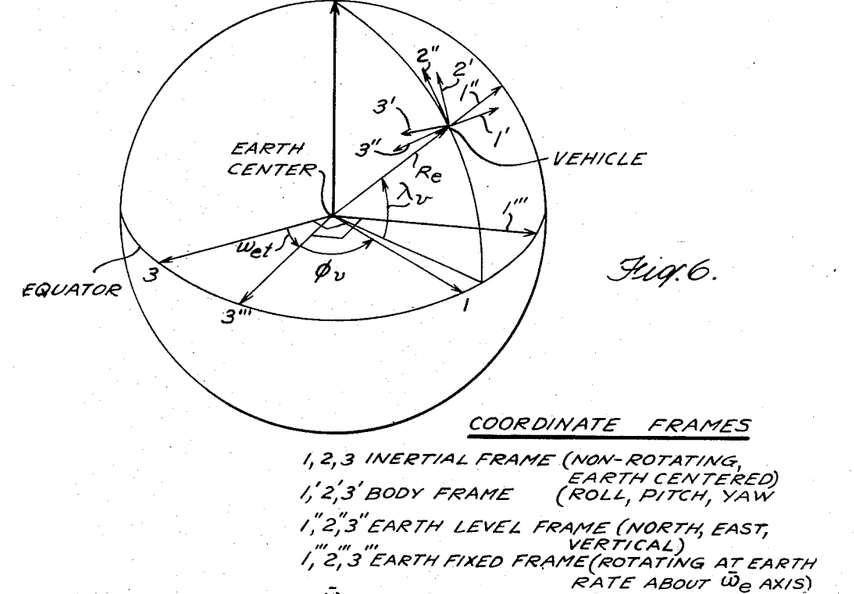
FIG. 6 illustrates the various coordinate frames employed in the navigational computations.
Figure 7:
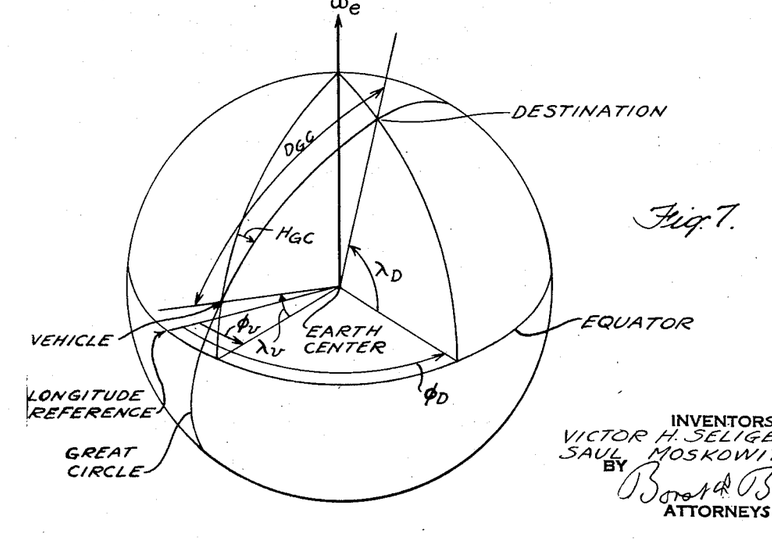
FIG. 7 illustrates the angles and distances employed in the great circle heading and distance to destination computations.

The matrix equation $$\dot{C} = C\Omega'' \quad (15)$$

may be used to determine the elements $C_{ij}$ of the C matrix when $\Omega''$ is defined correspondingly to $\Omega'$ as the matrix representing the vector operation $\bar{\omega}X$ in earth-level space with elements $\omega''_1$, $\omega''_2$ and $\omega''_3$. In other words, the elements of $\Omega''$ are $\omega''_1$, the angular velocity components of the earth-level space relative to inertial space. Expressed in earth-level space:

$$\omega''_1 = \omega_e \sin \lambda_v + \dot{\phi}_v \sin \lambda_v \quad (16)$$

$$\omega''_2 = -(\dot{X})''_3/R \quad (17)$$

$$\omega''_3 = (\dot{X})''_2/R \quad (18)$$

where $\omega_e$ is the magnitude of the angular velocity vector $(\bar{\omega}_e)$ of the earth relative to inertial space, $\lambda_v$ is latitude of the air-borne vehicle, $\phi_v$ is the longitude of the air-borne vehicle, $\dot{X}''_2$ and $\dot{X}''_3$ are the components of $(\dot{\bar{r}})_I$ in earth-level space, $(\dot{\bar{r}})_I$ is the time derivative of the vector $\bar{r}$ relative to inertial space, $\bar{r}$ is the vector from the earth's center to the vehicle, and R is the magnitude of the $\bar{r}$ vector, see FIG. 6.

Equations 16, 17 and 18 represent the elements of $\Omega''$ used to compute the elements $C_{ij}$ of the transformation matrix C. While Equation 5 must be solved rapidly, Equation 15 may be solved at a much slower rate.

Equations 16, 17 and 18 are solved in an Inertial/Earth-Level Angular Rate Computation computer section 74 in conjunction with two feedback loops to be decribed later.

For solving Equation 16, the longitude and latitude of the vehicle may be provided in any one of many ways.

The latitude of the vehicle $(\lambda_v)$ may be obtained from:

$$\lambda_v = \arcsin X_2/R \quad (19)$$

where $X_2$ is available from computer 50 on lead 93, or alternately $$\lambda_v = \lambda_{(0)} + \int_0^t \omega''_3 dt \quad (20)$$

Similarly, vehicle longitude $(\phi_v)$ may be expressed in two independent forms.

$$\phi_v = \arctan \frac{-X_3 \sin \omega_e t + X_1 \cos \omega_e t}{X_3 \cos \omega_e t + X_1 \sin \omega_e t} \quad (21)$$

or, alternately, $$\phi_v = \phi_{(0)} + \int_0^t \dot{\phi}_v dt \quad (22)$$

where:

$$\dot{\phi}_v = \omega''_2 - \omega_e \cos \lambda_v \quad (23)$$

Equations 19 and 21 can be determined by positional information and are "fixed" upon the "updating" of the positional computation.

Equations 20 and 22 can be "updated" by correcting $\phi_{(0)}$ and $\lambda_{(0)}$ with new latitude and longitude data.

In FIG. 2, Equations 20 and 22 in conjunction with 23 are employed by a Latitude-Longitude Computer 76 to provide $\lambda_v$ and $\phi_v$ on leads 78 and 80 connecting to computer 74. However, computer 76 requires, as an input, $\omega''_2$ and $\omega''_3$ on leads 81 and 82 according to Equations 20 and 23 to determine $\lambda_v$ and $\phi_v$ while $\omega''_2$ and $\omega''_3$ cannot be determined by computer 74 until $\lambda_v$, $\dot{\phi}_v$, $(\dot{X})''_3$ and $(\dot{X})''_2$ are known to satisfy Equations 16, 17 and 18. However, for purposes of Equations 20 and 22 the initial known positional information $\lambda_{(0)}$ and $\phi_{(0)}$ in inertial space is provided by the computer control 52 over leads 83 and 84, respectively.

In order to provide $(\dot{X})''_2$ and $(\dot{X})''_3$ as inputs to computer 74 on leads 85 and 86, the outputs $\omega''_1$, $\omega''_2$ and $\omega''_3$ from computer 74 on leads 87, 88 and 89 are connected to the input side of an Inertial/Earth-Level Attitude Computer 90. Computer 90 solves the matrix Equation 15 to provide the elements $C_{ij}$ of the C matrix on lead 92 as an input to an Inertial/Earth-Level Computer 94, the other inputs to computer 94 being the quantities $\dot{X}_1$, $\dot{X}_2$ and $\dot{X}_3$ on leads 68, 69 and 70 from computer 50. $C_{ij}$ represent direction cosines similar to $b_{ij}$ which are used for converting vector components from the inertial frame to the earth level frame. Computer 94 performs the matrix operation $C^{-1}(\dot{\bar{r}})_I$ to provide the quantities $(\dot{X})''_2$ and $(\dot{X})''_3$ on leads 85 and 86 as required by computer 74.

Computer 94 responds to the following equations:

$$(\dot{X})''_2 = C_{12}\dot{X}_1 + C_{22}\dot{X}_2 + C_{32}\dot{X}_3 \quad (24)$$

$$(\dot{X})''_3 = C_{13}\dot{X}_1 + C_{23}\dot{X}_2 + C_{33}\dot{X}_3 \quad (25)$$

Accordingly in FIG. 2 there are provided two feedback loops to computer 74 so that the values $\lambda_v$, $\phi_v$, $(\dot{X})''_2$ and $(\dot{X})''_3$ can rapidly adjust themselves, by interaction among themselves, to simultaneously satisfy Equations 16, 17, 18, 20, 22, 23, 24 and 25. One of such feedback loops is from computer 74 to computer 90 to computer 94 and back to computer 74 over leads 85 and 86. The other feedback loop is from computer 74 to computer 76 over leads 81 and 82 and back ot computer 74 over leads 78 and 80.

As desired output information from the system in FIG. 2, leads 78a and 80a from computer 76 provide the latitude $\lambda_v$ and longitude $\phi_v$ of the vehicle.

In the event the Equation 19 is employed by computer 76, a lead 93 in FIG. 1 conveys the quantity $X_2$ from computer 50 to computer 76.

(B) Roll, pitch and yaw

When Equations 16, 17, 18, 20, 22, 23, 24 and 25 are satisfied, the elements $C_{ij}$ of the C matrix are provided on a lead 95 (as well as on lead 92) which together with the elements $b_{ij}$ of the B matrix on a lead 96 from computer 40 are received as inputs to a Body/Earth-Level attitude computer 98. Computer 98 responds to the D matrix equation according to Equation 4 for providing the elements $d_{ij}$ of the D matrix on a lead 100. The elements of the D matrix, which is the transformation between body and earth-level space, implicitly contain the roll, pitch and yaw of the vehicle relative to earth-level space.

If the roll of the vehicle is designated by $\theta_R$, $$\theta_R = \text{arc tan} \frac{d_{13}}{d_{11}} \quad (26)$$

If the pitch of the vehicle is designated by $\theta_p$, $$\theta_p = \text{arc tan} \frac{d_{12}}{d_{11} \cos \theta_R + d_{13} \sin \theta_R} \quad (27)$$

Also, the heading or yaw of the vehicle, $\theta_Y$, is $$\theta_Y = \text{arc tan} \frac{d_{32}}{d_{22}} \quad (28)$$

Equations 26, 27 and 28 are solved in a Roll, Pitch and Yaw Computation Computer section 102 which receives as input quantities the signals on lead 100. Computer section 102 provides, on leads 103, 104 and 105, the roll, pitch and yaw, respectively, of the vehicle.

(C) Course and distance computation

Great circle course navigation requires the computation of heading and range to destination. Great circle range $D_{GC}$ is the product of R and $\psi$, where $\psi$ is the great circle spherical angle between present position and destination. To compensate for the oblateness of the earth, R must be chosen in some meaningful way; the value of R at the point of destination, $R_D$, will be used. Accordingly, $$D_{GC} = R_D \psi \quad (29)$$

where: $R_D$ is the magnitude of the radius vector to the point of destination, $\psi$ is obtained by spherical trigonometry as $$\cos \psi = \cos (90 - \lambda_D) \cos (90 - \lambda_v)$$
$$+ \sin (90 - \lambda_D) \sin (90 - \lambda_v) \cos (\phi_v - \phi_D) \quad (30)$$

where the subscripts D and v refer, respectively to destination and present vehicle parameters.

The heading to destination, $H_{GC}$, is also obtained by spherical trigonometry.

$$\sin H_{GC} = \frac{\sin (90 - \lambda_D) \sin (\phi_v - \phi_D)}{\sin \psi} \quad (31)$$

$$\cos H_{GC} = \frac{\cos (90 - \lambda_D) - \cos \psi \cos (90 - \lambda_v)}{\sin \psi \sin (90 - \lambda_v)} \quad (32)$$

The combined use of Equations 31 and 32 removes ambiguities, and it results in:

$$\frac{\sin H_{GC}}{\cos H_{GC}} = \tan H_{GC} = \frac{\sin (90 - \lambda_D) \sin (\phi_v - \phi_D) \sin (90 - \lambda_v)}{\cos (90 - \lambda_D) - \cos \psi \cos (90 - \lambda_v)} \quad (33)$$

which yields a solution for heading to destination, $H_{GC}$.

Equations 29, 30, and 33 are solved in a Great Circle Course and Distance Computation Computer 110. Computer 110 receives as input quantities the vehicle present latitude $\lambda_v$ and present longitude $\phi_v$ on leads 78a and 80a, the magnitude of the $\bar{r}$ vector at the destination $R_D$ on lead 111 and the inertial latitude $\lambda_D$ and longitude $\phi_D$ at the destination, on leads 112 and 113. As output quantities, computer 110 provides the great circle heading $H_{GC}$ to destination on a lead 115 and the great circle distance $D_{GC}$ to destination on a lead 116.

(D) Ground speed

Ground speed may be computed on the basis of inertial computations. Ground speed is the difference between the velocity of the vehicle relative to inertial space and the velocity at the earth's surface directly under the vehicle relative to inertial space.

Hence:

$$(\dot{\bar{r}})_e = (\dot{\bar{r}})_I - \bar{\omega}_e \times \bar{r} \quad (34)$$

where: $(\dot{\bar{r}})_e$ is the time derivative of $\bar{r}$ relative to an earth-fixed space; $(\dot{\bar{r}})_I$ is the time derivative of $\bar{r}$ relative to inertial space; and $\bar{\omega}_e$ is the angular velocity vector of the earth relative to inertial space.

Equation 34, in earth-level space, yields the north-south $V_{N-S}$ and west-east $V_{W-E}$ components of ground speed.

$$V_{N-S} = -C_{12}\omega_e X_3 + C_{32}\omega_e X_1 + (\dot{X})''_2 \quad (35)$$

$$V_{W-E} = -C_{13}\omega_e X_3 + C_{33}\omega_e X_1 + (\dot{X})''_3 \quad (36)$$

Equations 35 and 36 are solved in a Ground Speed Computer 120 which receives as input quantities $\dot{X}''_2$ on lead 85, $\dot{X}''_3$ on lead 86, $X_1$ on lead 71, $X_3$ on lead 72, the $C_{ij}$ elements of the C matrix on lead 92 from computer 90 and $\omega_e$ from lead 122, the latter being connected to receive a signal from a device 124 corresponding to such known quantity. Computer 120, as an output quantity provides $V_{N-S}$ and $V_{W-E}$ on leads 126 and 127, respectively.

(II) DOPPLER-INERTIAL MODE

The Pure Inertial Mode of FIG. 2 provides an earth-level reference space with a bounded error of the vertical. The Doppler-Inertial Mode in FIG. 3 additionally employs doppler radar to provide error velocity damping and azimuth drift compensation about the vertical.

Equation 9 has been previously shown as:

$$\bar{A} = (\ddot{\bar{r}})_I + \bar{g}$$

where $\bar{A}$ is the output of an orthogonal triad of accelerometers and $(\ddot{\bar{r}})_I$ is the second time derivative of the vector $\bar{r}$ relative to inerital space.

Adding $C_1(\dot{\bar{r}})_I$ to both sides of Equation 9 in order to provide for damping yields:

$$\bar{A} + C_1(\dot{\bar{r}})_I = (\ddot{\bar{r}})_I + C_1(\dot{\bar{r}})_I + \bar{g} \quad (37)$$

Since $$(\dot{\bar{r}})_I = (\dot{\bar{r}})_e + \bar{\omega}_e \times \bar{r} \quad (38)$$

where $(\dot{\bar{r}})_e$ is the time derivative of $\bar{r}$ relative to earth-fixed space; and $\bar{\omega}_e$ is the angular velocity vector of the earth relative to inertial space. Equation 37 becomes:

$$\bar{A} + C_1(\dot{\bar{r}})_e + C_1(\bar{\omega}_e \times \bar{r}) = (\ddot{\bar{r}})_I + C_1(\dot{\bar{r}})_I + \bar{g} \quad (39)$$

But $(\dot{\bar{r}})_e$ is the output $\bar{U}_D$ of the body mounted Doppler Radar 200 shown in FIGS. 1 and 3 and $\bar{g} = K\bar{r}/R^3$ Hence:

$$(\ddot{\bar{r}})_I + C_1(\dot{\bar{r}})_I + K\bar{r}/R^3 = \bar{A} + C_1\bar{U}_D + C_1(\omega_e \times \bar{r}) \quad (40)$$

In the chosen inertial space $$\omega_e = \begin{pmatrix} 0 \\ \omega_e \\ 0 \end{pmatrix} \quad (41)$$

$$A = BA' \quad \text{(See Eq. 1)}$$
$$U_D = BU_{D'} \quad (42)$$

Equation 40 becomes, in component form:

$$0 = \ddot{X}_1 + C_1\dot{X}_1 + (K/R^3)X_1 - b_{11}A'_1 - b_{12}A'_2 - b_{13}A'_3 \\ - C_1b_{11}U_{D'_1} - C_1b_{12}U_{D'_2} - C_1b_{13}U_{D'_3} - C_1\omega_eX_3 \quad (43)$$

$$0 = \ddot{X}_2 + C_1\dot{X}_2 + (K/R^3)X_2 - b_{21}A'_1 - b^{22}A'_2 - b_{23}A'_3 \\ - C_1b_{21}U_{D'_1} - C_1b_{22}U_{D'_2} - C_1b_{23}U_{D'_3} \quad (44)$$

$$0 = \ddot{X}_3 + C_1\dot{X} + (K/R^3)X_3 - b_{31}A'_1 - b_{32}A'_2 - b_{33}A'_3 \\ - C_1b_{31}U_{D'_1} - C_1b_{32}U_{D'_2} - C_1b_{33}U_{D'_3} - C_1\omega_eX_1 \quad (45)$$

Equations 43, 44 and 45 are solved in computer section 50' in FIG. 3 and yield solutions for both $\overline{X}$ and $(\dot{\overline{X}})_I$ in the Doppler-Inertial Mode.

It is to be noted that Equations 43, 44 and 45 become identical with Equations 12, 13 and 14 when $C_1 = 0$.

The navigational system in FIG. 2 incorporates a mathematical earth-level space that has drift characteristics which are bounded except about the vertical. This characteristic is similar to that exhibited by a physical earth-level platform. However, it is also possible by use of Doppler data as shown in FIG. 3 to correct drift about the vertical. The components of the earth's angular velocity vector $\omega_e$ in any particular space may be computed by means of the vector equation.

$$(\dot{\bar{r}})_I = (\dot{\bar{r}})_e + \bar{\omega}_e \times \bar{r} \quad (46)$$

In earth-level space there should be no component of $\bar{\omega}_e$ in the $X''_3$ direction. If $\omega''_{e_3} \neq 0$, the azimuth reference has drifted from north. Thus $\omega''_{e_3}$ may be used as an error signal added to the value of $\omega''_1$ computed by Equation 16 to bring the reference back on north. In earth-level space, the component $\omega''_{e_3}$ is obtained from $$(\dot{X})''_2 = d_{21}U_{D'_1} + d_{22}U_{D'_2} + d_{23}U_{D'_3} + \omega''_{e_3}R \quad (47)$$

which is one of the three component equations of Equation 46. Solving for $\omega''_{e_3}$, $$\omega''_{e_3} = \frac{1}{R}[(\dot{X})''_2 - d_{21}U_{D'_1} - d_{22}U_{D'_2} - d_{23}U_{D'_3}] \quad (48)$$

The corrected form of Equation 16 is $$\omega''_1 = \omega_e \sin \lambda_V + \dot{\phi}_V \sin \lambda_V + K'' \omega''_{e_3} \quad (49)$$

where $K''$ is a constant.

FIG. 3 is FIG. 2 modified by the addition thereto of the body-mounted Doppler Radar equipment 200, a Body-Inertial Doppler Velocity Transformation Computer 202, a Body-Earth-Level Doppler Velocity Computer 204 and a Azimuth Drift Correction Computer 206.

The signals $U_{D'_1}$, $U_{D'_2}$ and $U_{D'_3}$ from 200 on leads 211, 212 and 213, respectively, are the components in body space of the velocity output $\overline{U}_{D'}$ of the Doppler Radar. Computer 202 performs the matrix computation $BU_{D'}$ by receiving the signals on leads 211, 212 and 213 and, additionally, the elements $b_{ij}$ from computer 40 on a lead 215 to yield $U_{D_1}$, $U_{D_2}$ and $U_{D_3}$ in inertial space on leads 217, 218 and 219. Leads 217, 218 and 219 are connected between computers 202 and 50. Accordingly, computer 50' is provided with all the input information required to solve Equations 43, 44 and 45.

Additionally the signals $U_{D'_1}$, $U_{D'_2}$ and $U_{D'_3}$ are transmitted to computer 204 where the matrix operation $DU_{D'}$ is performed as 204 receives as another input on a lead 220 the elements of $d_{ij}$ of the D matrix. Computer 204 provides on leads 222, 223, and 224 the quantities $d_{21}U_{D'_1}$, $d_{22}U_{D'_2}$ and $d_{23}U_{D'_3}$, respectively. The outputs from 204 are connected as inputs to computer 206 together with the quantity R on lead 65 from computer 62 and the quantity $X''_2$ and lead 85 from computer 94.

The Azimuth Drift Correction Computer 206 solves Equation 48 to provide $\omega''_{e_3}$ as a signal on a lead 230 connecting to computer 74. Computer 74 is then able to correct $\omega''_1$ in accordance with Equation 49.

(III) CELESTIAL-INERTIAL MODE

The celestial-inertial system is formulated in terms of a number of mathematically computed reference spaces. Employment of body-mounted sensors and a digital computer permits accurate determination of vehicle position in latitude and longitude, and a bounded indication of the vertical. Such a reference is required for celestial modes of operation. By proper choice of transformations and reference spaces the number of high-speed real time computations is held to a minimum.

Because of the inherent accuracy with which the vertical can be determined in flight, as contrasted with azimuthal determination, this celestial-inertial system, like more conventional air-borne celestial navigators, determines vehicle position by measurement of star altitude with respect to an earth-level reference. In contrast to other systems, however, the proposed system makes use of a mathematical, rather than a physical, earth-level reference.

Latitude and longitude may be determined by means of a celestial tracker 300 used in conjunction with knowledge of the vertical. The following discussion in conjunction with FIG. 4 will be limited to the standard two-star method as an illustrative example.

Star coordinates are stored in Celestial Data Computer 302. Two of the possible storage techniques are given below. The declination $\lambda$ of each star may be stored as a constant and right ascension $\phi$, generated by means of the relation.

$$\phi = \phi_{(0)} + \omega_e(T_0 - T_1) \quad (50)$$

where $(T^0 - T_1)$ is sidereal time. If the normalized coordinates of each star are stored under control of computer 52 as $Y_1$, $Y_2$, and $Y_3$, then declination and right ascension are given by $$\lambda = \arcsin Y_2 \quad (51)$$

$$\phi = \arctan \frac{-Y_3 \sin \omega_e t + Y_1 \cos \omega_e t}{Y_3 \cos \omega_e t + Y_1 \sin \omega_e t} \quad (52)$$

Standard methods for correcting for atmospheric refraction can be included in these computations.

If the two reference stars as selectively yielded by computer 302 are characterized by $\lambda_1$, $\phi_1$ (for the first star) and $\lambda_2$, $\phi_2$ (for the second star) on leads 304, 305, 306 and 307, respectively, then $$\cos \mu_1 = \cos(90 - \lambda_1)\cos(90 - \lambda_V) \\ + \sin(90 - \lambda_1)\sin(90 - \lambda_V)\cos(\phi_V - \phi_1) \quad (53)$$

$$\cos \mu_2 = \cos(90 - \lambda_2)\cos(90 - \lambda_V) \\ + \sin(90 - \lambda_2)\sin(90 - \lambda_V)\cos(\phi_V - \phi_2) \quad (54)$$

The angles $\mu_1$ and $\mu_2$ are the angles between the stars and the vertical. Equations 53 and 54 are two equations in two unknowns, $\phi_V$ and $\lambda_V$, and as such yield solutions in computer 309 for the vehicle's latitude and longitude on leads 310 and 311, respectively.

To solve Equations 53 and 54 in computer 309, values for $\mu_1$ and $\mu_2$ must be obtained from the trunnion angles $\alpha$ and $\beta$ of the body-mounted celestial tracker 300. Such information, for the first star, $\alpha_1$, $\beta_1$ and, for the second star, $\alpha_2$, $\beta_2$, are transmitted from celestial tracker 300 to computer 309 over leads 312, 313, 314 and 315, respectively. The dot or scalar product of the vertical and the line of sight of the telescope may be used to yield the cosine of $\mu$. If the elevation and bearing of the telescope are $\alpha$ and $\beta$, respectively, then the transformation of a unit line of sight into body axes yields $$\begin{aligned} LOS'_1 &= \cos \alpha \\ LOS'_2 &= \cos \beta \sin \alpha \\ LOS'_3 &= \sin \beta \sin \alpha \end{aligned} \quad (55)$$

Transformation of the earth-level space $\hat{1}''$ axis (the vertical) into the body space yields $$\hat{1}'' \cdot \hat{1}' = d_{11} \quad \hat{1}'' \cdot \hat{2}' = d^{12} \quad \hat{1}'' \cdot \hat{3}' = d_{13} \tag{56}$$

Thus the dot product between the unit line of sight and the unit vertical is $$\widehat{LOS} \cdot 1'' = \cos \mu = d_{11} \cos \alpha + d_{12} \cos \beta \sin \alpha - d_{13} \sin \beta \sin \alpha \tag{57}$$

For two stars $$\cos \mu_1 = d_{11} \cos \alpha_1 + d_{12} \cos \beta_1 \sin \alpha_1 - d_{13} \sin \beta_1 \sin \alpha_1$$
$$\cos \mu_2 = d_{11} \cos \alpha_2 + d_{12} \cos \beta_2 \sin \alpha_2 - d_{13} \sin \beta_2 \sin \alpha_2 \tag{58}$$

The elements $d_{ij}$ of the D matrix are supplied to computer 309 from computer 98 over lead 220.

Erection of a telescope for initial star acquisition requires the inverse of the operation described above. Knowledge of the vehicle's approximate position from the output of computer 76 on leads 320 and 321, attitude from computer 98 on lead 220 and appropriate star data from computer 302 on leads 304 to 306 is used in an Erection Computer 325 to determine the approximate values for the angles $\alpha$ on leads 328 and 329 and $\beta$ on leads 330 and 331 so that the telescope can be directed to the vicinity of the desired star. The differences between these computed quantities and the actual $\alpha$ and $\beta$ may be used as servo error signals. If the star's azimuth is called $\rho$, then $\rho$ and $\mu$ for each star are represented in an unambiguous manner, by the equations, $$\frac{\sin \rho_1}{\cos \rho_1} = \frac{\sin (\phi_v - \phi_1) \sin (90 - \lambda_1)}{\sin (90 - \lambda_v) \cos (90 - \lambda_1)} - \cos (90 - \lambda_v) \cos (\phi_v - \phi_1) \sin (90 - \lambda_1) \tag{59}$$

$$\frac{\sin \mu_1}{\cos \mu_1} = \cos \rho_1 \frac{(\sin (90 - \lambda_v) \cos (90 - \lambda_1)}{\cos (90 - \lambda_v) \cos (90 - \lambda_1) +} - \cos (90 - \lambda_v) \cos (\phi_v - \phi_1) \sin (90 - \lambda_1)) + \sin \rho_1 \sin (\phi_v - \phi_1) \sin (90 - \lambda_v)}{\sin (90 - \lambda_v) \cos (\phi_v - \phi_1) \sin (90 - \lambda_1)} \tag{60}$$

Equations 59 and 60 have been obtained by spherical trigonometry for the "1" star. A similar set of equations, with the "1" subscripts replaced by "2" subscripts, would apply to the second star. Note that while $\rho$ was not required for the position computations, it is required for the initial acquisition computations. This is so because not only an expression for $\cos \mu$, but also for $\sin \mu$ is required. In the calculations of $\alpha$ and $\beta$ for star acquisition purposes, there is also need for the angle $\rho$.

The components of the line of sight vector in body space may be used to compute (by trigonometry) the angles $\alpha$ and $\beta$. The components of the unit vector along the line of sight in earth-level space are $$\begin{pmatrix} \cos \mu_1 \\ \cos \rho_1 \sin \mu_1 \\ -\sin \rho_1 \sin \mu_1 \end{pmatrix} \tag{61}$$

when this vector is transformed into body space by the D matrix over lead 220 from computer 98 to computer 325 it becomes $$\begin{pmatrix} d_{11} \cos \mu_1 + d_{21} \cos \rho_1 \sin \mu_1 - d_{31} \sin \rho_1 \sin \mu_1 \\ d_{12} \cos \mu_1 + d_{22} \cos \rho_1 \sin \mu_1 - d_{32} \sin \rho_1 \sin \mu_1 \\ d_{13} \cos \mu_1 + d_{23} \cos \rho_1 \sin \mu_1 - d_{33} \sin \rho_1 \sin \mu_1 \end{pmatrix} \tag{62}$$

Thus the equations which yield $\alpha_1$ and $\beta_1$ are $$\frac{\sin \beta_1}{\cos \beta_1} = -\frac{d_{13} \cos \mu_1 + d_{23} \cos \rho_1 \sin \mu_1 - d_{33} \sin \rho_1 \sin \mu_1}{d_{12} \cos \mu_1 + d_{22} \cos \rho_1 \sin \mu_1 - d_{32} \sin \rho_1 \sin \mu_1} \tag{63}$$

and $$\frac{\sin \alpha_1}{\cos \alpha_1} = \frac{\cos \beta_1 (d_{12} \cos \mu_1 + d_{22} \cos \rho_1 \sin \mu_1 - d_{32} \sin \rho_1 \sin \mu_1)}{d_{11} \cos \mu_1 + d_{21} \cos \rho_1 \sin \mu_1 - d_{31} \sin \rho_1 \sin \mu_1} + \frac{\sin \beta_1 (d_{13} \cos \mu_1 + d_{23} \cos \rho_1 \sin \mu_1 - d_{33} \sin \rho_1 \sin \mu_1)}{d_{11} \cos \mu_1 + d_{21} \cos \rho_1 \sin \mu_1 - d_{31} \sin \rho_1 \sin \mu_1} \tag{64}$$

Equations 59, 60, 63 and 64 are solved in computer 325.

Roll, Pitch, Yaw, Great Circle Course and Distance to Destination and Ground Speed calculations are performed in computers 102, 110 and 120, respectively, in the manner disclosed and described with reference to FIG. 2 with the exception that now celestially computed latitude ($\lambda_{vc}$) and longitude ($\phi_{vc}$) are used on leads 310 and 311.

To maintain a relatively stable celestial computing space, an earth-level reference is established. Transformations between inertial space and earth-level space are accomplished through the C matrix. This matrix is a slowly varying operator which is dependent upon the vehicle's position relative to an earth-fixed reference frame. All computations in inertial and earth-level space may be performed at relatively slow computational rates.

In addition to allowing computation of vehicle position in the inertial (FIG. 2) and doppler-inertial (FIG. 3) modes of operation, the mathematical vertical, together with the outputs of a body-mounted celestial tracker, permit computation of vehicle position in the celestial modes of operation (FIGS. 4 and 5).

(IV) CELESTIAL-INERTIAL-DOPPLER MODE

FIG. 5 is a block diagram of the most accurate mode of navigation when existing weather and terrain conditions permit the proper operation of all component sections therein. FIG. 5 combines into the system of FIG. 4, the doppler radar components 200, 202, 204, 206, 210, 211–213, 215, 217, 218, 219, 220, 222, 223, 224 and 230 in the manner that such components were incorporated to form FIG. 3 from FIG. 2.

The broad outline of the system for the operational mode in FIG. 5 is displayed in the following table:

| Sensor | Provides Quantity | With respect to— |
|---|---|---|
| Doppler | Velocity | Earth Frame. |
| Gyros | Angular Velocity | Inertial Frame. |
| Accelerometers | Acceleration | Do. |
| Celestial Tracker | Celestial Orientation | Body Frame. |
| Altimeter | Schuler Radius | Center of Earth. |

The gyro information is used to provide the BODY/INERTIAL reference frame transformation. The doppler radar, accelerometer, and altimeter information is combined to establish the INERTIAL/EARTH-LEVEL transformation. The celestial tracker provides the CELESTIAL/BODY transformation.

The BODY/INERTIAL and INERTIAL/EARTH-LEVEL transformation combine to give the BODY/EARTH-LEVEL transformation which, in effect, can be used with the CELESTIAL/BODY transformation to yield the CELESTIAL/EARTH-LEVEL transformation which is the desired measure of the vehicle position.

In noncelestial modes of operation (FIGS. 2 and 3) the system performs the positional computation in a manner which is mathematically identical to computations using an earth-level platform. Doppler radar is used both for velocity damping and azimuth drift compensation.

(V) COMPUTER DETAILS

Speed and accuracy requirements for the computer as dictated by system considerations are listed in the following table. The last column is a suggested method of instrumentation if digital methods are to be employed.

It is to be noted, however, that the computer need not be digital to achieve the desired mechanization.

| Computation | Speed of Computation | Required Accuracy | Method of Computation |
|---|---|---|---|
| Body-inertial coordinates attitude computation. | High | High | Second order DDA. |
| Body-inertial coordinates acceleration transformation. | do | do | Incremental. |
| Body-inertial Doppler velocity computation. | do | do | Do. |
| Position Vector magnitude computation. | Low | do | Do. |
| Inertial position computation. | do | do | Do. |
| Inertial-earth-level angular rate computation. | do | do | Do. |
| Inertial earth-level attitude computation. | do | do | Do. |
| Inertial earth-level velocity computation. | do | do | Do. |
| Vertical drift correction. | do | do | Do. |
| Body earth-level attitude computation. | High | do | Do. |
| Body earth-level doppler velocity computation. | do | do | Do. |
| Roll, pitch, and yaw computation. | Moderate | Moderate | Do. |
| Ground speed computation. | Low | Low | Do. |
| Latitude-Longitude computation (Interial). | do | High | Do. |
| Great circle course and distance computation. | do | do | Whole Number. |
| Celestial data computation. | do | do | Do. |
| Erection computer (celestial tracker). | Moderate | Moderate | Do. |
| Latitude-Longitude (celestial). | Low | High | Do. |

The arrangement of the computer sections shown in FIGS. 1–5 is readily implementable with present available component devices and circuits by engineers familiar with the present state of the computer art. And, in fact, all of the mathematical computations shown can be performed by proper manipulation of commercially available computers such as the IBM 704 or the Bendix G–15. Furthermore, the high accuracy computations shown in the above table can be performed by the Fordac computer developed by the Ford Instrument Company, Division of Sperry Rand Corporation. The remaining low and moderate speed computations can be performed by a properly programmed Verdan or Fordan computer. It is also feasible to combine all the required functions in one special purpose computer.

While there has been described and pointed out the fundamental novel features of the invention as applied to preferred embodiments, it will be understood that various omissions and substitutions and changes in the form and details of the devices illustrated and in its operation may be made by those skilled in the art, without departing from the spirit of the invention. It is the intention, therefore, to be limited only as indicated by the scope of the following claims.

What is claimed is:

1. A navigational system for an air-borne vehicle which comprises gyro sensor means in the vehicle for providing angular velocity with respect to an inertial frame, accelerometer means in the vehicle for providing acceleration with respect to said inertial frame, a celestial tracker in the vehicle for providing celestial orientation with respect to a body frame, an altimeter for providing the Schuler radius with respect to the center of the earth, means for providing body/inertial reference frame transformation connected to the output of said gyro sensor means, means for providing inertial/earth-level transformation, connected to the output of said accelerometer means and said altimeter, means for providing celestial/body transformation connected to the output of said celestial tracker, means for providing body/earth-level transformation connected to the output of said body/inertial transformation means and said inertial/earth-level transformation means, and means for providing celestial/earth-level transformation connected to the output of said body/earth-level transformation means and said celestial/body transformation means.

2. A navigational system according to claim 1 including Doppler means coupled to said inertial/earth-level transformation means.

3. A navigational system for an air-borne vehicle which comprises a first means for measuring acceleration of said vehicle along three body axes thereof, a second means for measuring the angular velocity of the vehicle about said three axes, a body-inertial computer coupled to the output of said second means, a means for providing body-inertial acceleration transformation coupled to the output of said body-inertial computer and said first means for providing acceleration of the vehicle along three axes in inertial space, a third means for providing distance from the center of the earth to said vehicle, an inertial position computer coupled to said body-inertial acceleration transformation means and said third means to provide a first output for yielding the velocity of said vehicle along said three axes in inertial space, an inertial/earth-level angular rate computer coupled to the output of said third means, a first closed feedback loop comprising means for providing body-inertial acceleration transformation, an inertial/earth-level attitude computer and an inertial/earth-level velocity computer, said inertial position computer being connected at a first output side to said inertial/earth-level attitude computer and said inertial/earth-level velocity computer, a second closed feedback loop comprising an inertial/earth-level angular rate computer and an inertial latitude-longitude computer, a body/earth-level attitude computer coupled at its input side to said body-inertial computer and said inertial/earth-level attitude computer, and a roll, pitch and yaw computer coupled to the output of said body/earth-level attitude computer for providing the roll, pitch and yaw of the vehicle relative to earth-level space.

4. A navigational system according to claim 3 including a fourth means coupled to said inertial latitude-longitude computer for providing an initial latitude and longitude of the vehicle in inertial space and coupled to said inertial position computer for providing an initial position and initial velocity of the vehcle in inertial space.

5. A navigational system according to claim 3 wherein said inertial position computer has a second output for yielding the position of the vehicle in inertial space and wherein there is provided a fifth means for yielding the angular velocity of the earth in inertial space and a ground speed computer coupled at its input side to said second output of said inertial position computer, said inertial/earth-level velocity computer, said inertial/earth-level attitude computer and said fifth means for providing the ground speed of the vehicle in a north-south direction and an east-west direction.

6. A navigational system according to claim 5 including a sixth means for providing the longitude and latitude and earth radius of a destination of the vehicle in inertial space and a great circle course and distance computer coupled at its input side to said sixth means, said inertial latitude-longitude computer and said third means for providing the great circle heading and distance to said vehicle destination.

7. A navigational computer according to claim 3 including a Doppler radar means mounted on the vehicle, a body-inertial attitude computer, means for providing body-inertial Doppler velocity transformation coupled at its input side to said Doppler radar means and said body-inertial attitude computer and at its output side to said inertial position computer, a body/earth-level Doppler velocity computer coupled at its input side to said body/earth-level attitude computer and said Doppler radar means, and an azimuth drift corrector coupled at its input side to said third means, said body/earth-level Doppler velocity computer and said inertial/earth-level velocity computer, said azimuth drift corrector being connected at its output side to said inertial/earth-level angular rate computer.

8. A navigational computer according to claim 3 including a celestial data computer for providing the declination and right ascension of a plurality of selected stars, an erection computer coupled at its input side to said celestial data computer, to said inertial latitude-longitude computer and to said body/earth-level attitude computer, a celestial tracker coupled at its input side to said erection computer and a celestial latitude-longitude computer coupled at its input side to said celestial tracker and said body/earth-level attitude computer for providing the latitude and longitude of the vehicle.

9. A navigational system according to claim 6 including a Doppler radar means mounted on the vehicle, a means for providing body-inertial Doppler velocity transformation coupled at its input side to said Doppler radar means and said body-inertial attitude computer and at its output side to said inertial position computer, a body/earth-level Doppler velocity computer coupled at its input side to said body/earth-level attitude computer and said Doppler radar means, and an azimuth drift corrector coupled at its input side to said third means, said body/earth-level Doppler velocity computer and said inertial/earth-level velocity computer, said azimuth drift corrector being connected at its output side to said inertial/earth-level angular rate computer.

10. A navigational system for an air-borne vehicle which comprises gyro sensor means in the vehicle for providing angular velocity wtih respect to an inertial frame, accelerometer means in the vehicle for providing acceleration with respect to said inertial frame, an altimeter for providing the Schuler radius with respect to the center of the earth, means for providing body/inertial reference frame transformation coupled to the output of said gyro sensor means, means for providing inertial/earth-level transformation coupled to said accelerometer means and said altimeter and means for providing body/earth-level transformation coupled to said body/inertial transformation means and said inertial/earth-level transformation means.

11. A navigational system according to claim 10 including Doppler means coupled to said inertial/earth-level transformation means.

References Cited by the Examiner

UNITED STATES PATENTS

| | | | |
|---|---|---|---|
| 2,930,035 | 3/60 | Altekruse | 73—178 X |
| 2,934,267 | 4/60 | Wirkler | 73—178 |
| 2,996,268 | 8/61 | Brown et al. | 244—14 |
| 3,023,616 | 3/62 | Miller et al. | 73—178 |

OTHER REFERENCES

"Inertial Guidance," Special Report by Aviation Week by P. J. Klass, McGraw-Hill, 1956, Part II, pages 7 to 10, and Part IV, pages 17 to 19 most pertinent.

ROBERT B. HULL, *Primary Examiner.*

SAMUEL BOYD, SAMUEL FEINBERG, *Examiners.*